April 16, 1935. P. A. FRIEDELL 1,997,788
AUTOMATIC SPEED REDUCING FLUID CLUTCH
Filed April 22, 1931 2 Sheets-Sheet 2
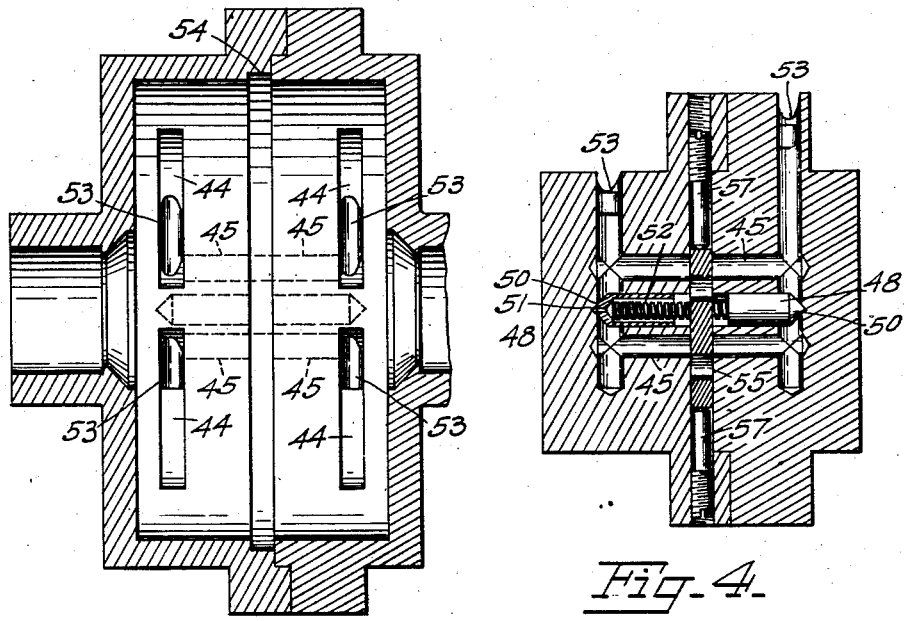
Fig. 3.
Fig. 4.
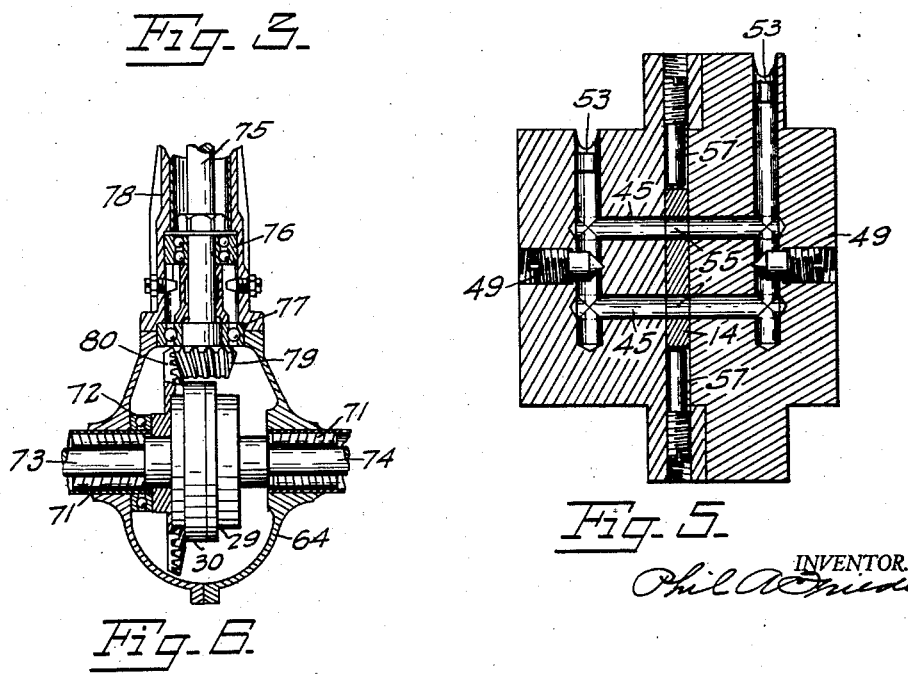
Fig. 6.
Fig. 5.
INVENTOR.

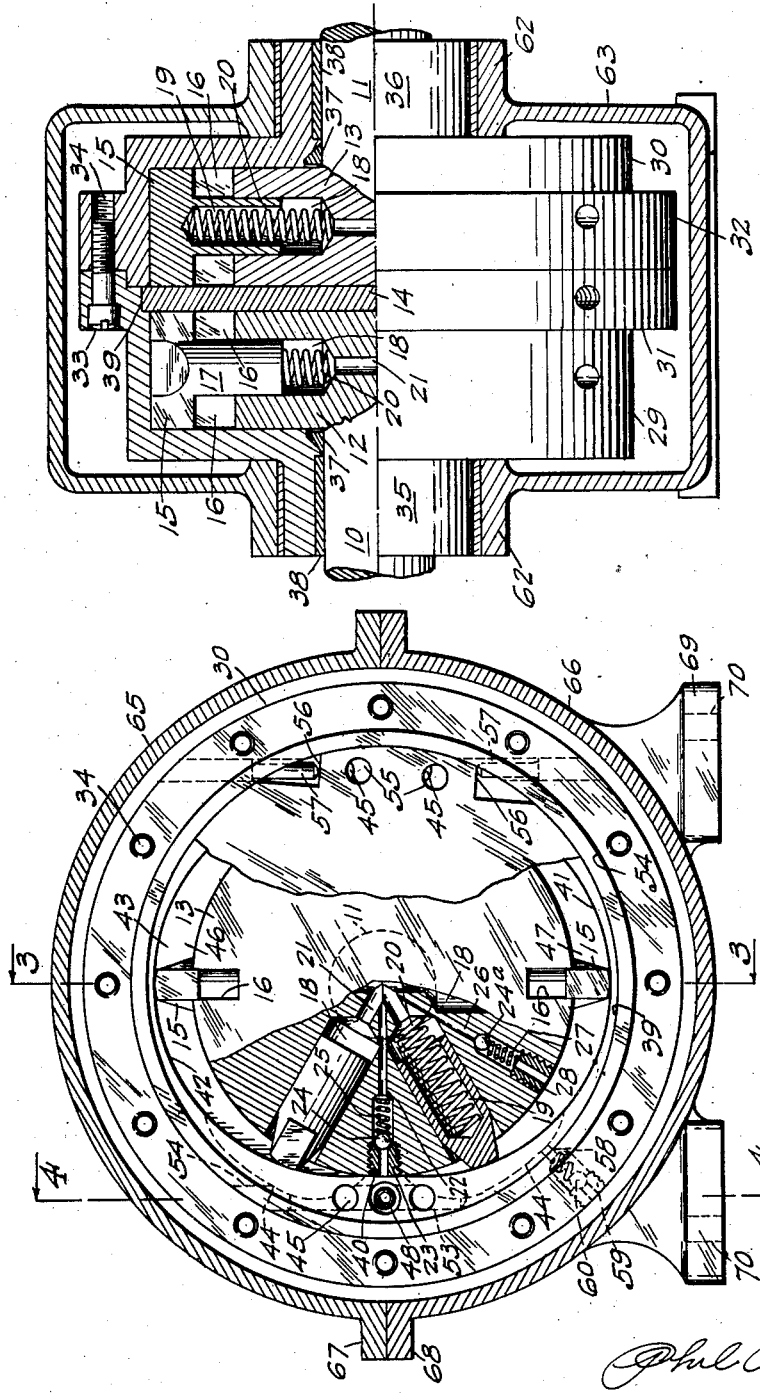

Patented Apr. 16, 1935

1,997,788

UNITED STATES PATENT OFFICE 1,997,788

AUTOMATIC SPEED REDUCING FLUID CLUTCH

Phil A. Friedell, Oakland, Calif.

Application April 22, 1931, Serial No. 531,965

15 Claims. (Cl. 192—58)

This invention is an automatic speed reducing differential and has special reference to a fluid actuated device which is especially adapted for use in automotive vehicles in place of the usual differential gear unit, and when so installed and properly adjusted to suit the normal weight of the vehicle and power of the motor, will automatically permit variation in speed in inverse ratio to the required axle torque, therefore the usual transmission is not required with the exception of the reverse gearing, and no shifting of gears except for reverse will be required.

In the present type of gear differential, in the event of no traction on one wheel, no torque is applied to the other wheel, consequently, power in such cases has no value, especially in such cases where one wheel is on ice while the other is on gritty material, which causes the one wheel to rotate at high speed while the other remains stationary.

In my fluid clutch, variation in speed of the two wheels may be adjusted to any desired value, but torque is always applied to both wheels, in fact the device may be so adjusted that just sufficient variation is available to permit the car to turn the shortest required curves without resistance to the turn. When so adjusted, the torque applied to the wheels is almost identical, and under the conditions previously set forth, with one wheel on ice and the other having necessary road friction, the vehicle would be driven without difficulty, and would negotiate ice and snow impossible with other methods.

The device may be used for many additional purposes, such as a speed reducing unit of either constant ratio or variable inversely with the torque, as a shock absorbing coupling to reduce the motor load at starting, as a shock absorber, as a two way drive at different speeds and in many other ways.

The objects of the invention therefore are:

First: to provide a fluid clutch for automotive vehicles which will replace all of the gears between the motor and rear axle except the reverse gears and means for driving the clutch drum, which may consist of either, the usual drive gear and pinion, or may be fluid driven by any known means.

Second; to provide a device as outlined which may be adjusted to any desired variation between the two axles and which will always deliver torque to both axles regardless of road friction.

Third; to provide a device as outlined which delivers constant torque to both axles while permitting variation in speed between the axles.

Fourth; to provide such a device with means whereby the ratio between speed of the driving member and the axles is increased as the required torque on the axles is increased, thereby obviating the necessity of change gears and the shifting thereof, the motor speed remaining constant while the wheel speed decreases.

Fifth; to provide such a device which will adjust itself automatically to varying road conditions, whereby with constant motor speed the vehicle will travel at a speed proportionate to the required axle torque.

Sixth; to provide such a clutch with means for automatically maintaining the proper amount of fluid for operation, to compensate for leakage past bearings and other losses.

Seventh; to provide a device as outlined which may be driven by one of the axles or shafts, and power taken from the other shaft at substantially the same or at a reduced speed as may be desired, adjustable means being provided for varying the ratio.

Eighth; to provide a device as outlined which is simple in construction and operation, positive and efficient in its results and which is substantially free from trouble.

Ninth; to provide a device as outlined which is easily and conveniently replaced and repaired, and which may be adapted to any type of drive, either differential or speed reducing, and in which the ratio may be varied inversely with the load or may be made constant.

Other objects and advantages of the invention will become apparent as the following description is read on the drawings forming a part of this specification, and in which similar reference characters are used to indicate similar parts throughout the several views, and in which:

Fig. 1 is a sectional elevation through the housing showing the interior construction, part of the median wall being broken away, and part of one of the rotors being shown in section.

Fig. 2 is a side elevation of Fig. 1 showing the housing in section and the clutch in half section.

Fig. 3 is a section taken on line 3—3 of Fig. 1 with the housing and rotors removed.

Fig. 4 is a section taken on line 4—4 of Fig. 1 with the housing removed.

Fig. 5 is similar to Fig. 4 except positive fluid control means are shown to provide for constant ratio.

Fig. 6 shows the invention as applied to an automotive vehicle.

The invention is fully illustrated in Fig. 1, the other views providing for a clearer understanding of the various details and parts making up the unit, and consists of a pair of shafts 10 and 11 independently rotatable relative to each other and having each a flange respectively 12 and 13 which coincidently form the rotors for the device.

The flanges 12 and 13 are interposed by a dividing wall 14, and are each provided with a plurality of radial vanes or blades 15, preferably six, each blade being slidable in transverse slots 16 and integral with a plunger 17 which is slidable in bores 18, the slot 16 being of sufficient depth to allow complete retraction of the vanes within the periphery of the flanges 12 and 13, and the bores 18 being of corresponding depth for the plunger 17. The plungers 17 have an axial bore 19 for reception of springs 20 adapted to urge the blades or vanes outwardly. The bores 18 are all interconnected by holes 21 intersecting at the center of the flanges 12 and 13.

Fluid equalizing valves are provided for maintaining the bores and other cavities within the flanges filled with fluid and permitting escape of excess fluid.

The intake and outlet valves are similarly constructed but oppositely disposed, the intake valve having a bore 22, centrally bored plug 23 with a seat for the valve ball 24 and a counterbore in which a spring 25 is seated and which urges the ball 24 against its seat.

The outlet valve is similarly constructed except the ball 24a is seated against the communicating port 26, and the spring 27 is seated against the plug 28.

The clutch drum consists of a pair of mating cylindrical members 29 and 30 having flanges 31 and 32 by which the two members are secured together as by screws 33, holes 34 being tapped through and permitting bolting of the drive gear to the rear face of the flange 32. Hubs 35 and 36 are formed integral with the end walls of the cylindrical members 29 and 30 respectively to provide bearings for shafts 10 and 11. Sealing rings 37 are provided to seal the interior of the clutch chamber against loss of oil. Suitable bushings are also provided as indicated at 38. An annular recess 39 is formed in one cylindrical member 29 which rotatably receives the dividing plate 14, which is centrally disposed in the assembled drum, forming two compartments.

Each compartment consists of a central bore 40 and two eccentric bores 41 and 42 forming a substantially elliptical compartment with restrictions, the bores being substantially equal to the diameter of the rotors.

Bypasses are provided in each restriction in each compartment and consist of a differential bypass and a slip bypass.

The differential bypass is provided to permit fluid to flow from one compartment to the other and consists of recesses 44 and transverse apertures 45 communicating with the recesses 44.

The slip bypasses are provided to permit restricted flow of fluid from one chamber to the other, as from chamber 46 on one side of the rotor to the other chamber 47 on the other side of the rotor, and according to the purpose for which the device is to be used is either provided with a spring valve 48, Fig. 4 or an adjustably restricted valve 49 as indicated in Fig. 5.

The spring actuated valve consists of a conical end plunger 48 having an equalizing aperture 51 formed in the tip and seated in a conical seat and urged by a spring 52. The pressure of the fluid on the exposed portion of the conical end produces a vertical reaction tending to lift the valve from its seat against the action of the spring 52.

The adjustably restricted valve 49 consists of a conical end screw seated in the conical seat, the point being similarly constructed to the spring actuated valve except no equalizing aperture is required or formed in the tip.

Either valve is adapted to close the bypasses 53 between the bypasses 45.

The slip bypasses consist of a bore 53 plugged at the periphery of the drum.

The dividing plate 14 is rotatably mounted in a counterbore 54 formed between the members 29 and 30 or as indicated in one of the members, being centrally disposed in the interior of the drum, the counterbore being greater in diameter than the major axis of compartment 43. Bypass apertures 55 are adapted to register with bypass apertures 45 in the restrictions on both sides. Seats 56 are formed in the periphery to cooperate with adjusting screws 57 which are adjustable from the exterior of the drum and threadedly secured therein.

An intake valve is provided in the periphery of the drum for the purpose of maintaining the free space in compartments 43 filled with fluid and compensate for leakage, and consist of an aperture 58 extending into recesses 44, a screw threaded plug 59 having an axial bore, a ball 60 seated against the plug 59 and a spring urging the ball 60 to close the port 58.

The drum is rotatably mounted in bearings 62 by means of integral hubs 35 and 36, the bearings 62 being integral with a casing 63 or a differential housing 64. The casing is intended to be provided when the device is to be used as a speed reducing transmission, coupling, or shock absorber and consists of the upper or cap member 65 and a base 66 and having cooperating flange members 67 and 68 suitably bolted together. The base 66 has integral feet and suitable bolt holes 70 for rigid mounting.

The differential consists of the usual housing 64 provided with suitable bearings 71 and thrust bearing 72 for the axles 73 and 74, a drive shaft 75 mounted in bearings 76 and 77 and the drive or propeller shaft housing 78, the drive pinion 79 being fixed to the end of drive shaft 75. The drive gear 80 is suitably fixed to the drum members 29 or 30 and rotates the drum.

The operation of the device when used as a differential is as follows; plate 14 is adjusted by means of screws 57 to permit just sufficient difference in rotation of the shafts 10 and 11 to suit the particular conditions. Usually a slight opening as shown in Fig. 1 is sufficient. The chambers 46 and 47 and all interior cavities are filled with a medium or heavy oil or other suitable fluid, and the lower part of casing 63 is also supplied with fluid. As the drum 29—30 is driven by the drive gear 80, fluid back of the blades 15 in chambers 46 and 47 react between the restrictions and the blades forcing the rotors 12 and 13 to travel with the drum.

When the pressure exceeds a certain value, depending on the strength of springs 52, the fluid forces the valves 50 back and permit part of the fluid to pass through the aperture 53 from the rear of blade 15 to the other chamber, permitting the rotors 12 and 13 to independently lag or travel at a lower speed than that of the drum. In turning a corner, or where the torque is different on the two shafts 10 and 11, fluid passes from one compartment to the other through the bypasses 55. Thus lag of one rotor permits advance of the other rotor.

Under abnormal conditions, where sufficient differential action is not obtainable by the bypasses 55, which are operable under substantially no load conditions, the difference in load or torque on the two wheels will create excess pressure in the corresponding chamber, forcing the valve 50 in that chamber back farther than the corresponding valve in the other chamber or compartment, permitting more fluid to pass through one of the bypasses 53 than through the other, thereby permitting both, speed reducing and differential action of the rotors independently of each other.

The heavier the torque on shafts 10 and 11, the higher the ratio between the driving and driven members, as more fluid will be forced through the bypasses 53 from one chamber to the other.

Therefore, no transmission is required in a vehicle equipped with my fluid clutch except for reverse. Should there be insufficient fluid in the chambers, a partial vacuum will be created ahead of the blades 15 and fluid will be drawn through the valve 60. The fluid is also used to urge the blades 15 outwardly, the retraction of one plunger 17 displacing fluid and forcing other plungers outwardly. Should there be insufficient oil to fill all spaces within the rotors, the springs create suction which draws fluid from chambers 46 and 47 through the intake valves 24 of which there are preferably three equally spaced. Any excess of oil is forced out through the outlet valves 24a.

Uniform torque is provided constantly throughout each revolution of the rotors by means of the recess 44 which at no time permits more than two vanes to be subjected to load, and permits actuation only in a substantially uniform area of the chambers spanning two vanes.

The primary object of the invention is in its use as a speed reducing differential, however it is adapted to be used as a speed reducing transmission without change, and for such purpose, where a substantially uniform speed is to be maintained irrespective of the load, the device is housed as shown in Figs. 1 and 2, and the drum becomes a floating member. The plate 14 is adjusted to permit differential movement by bypassing fluid from one compartment to the other, and screws 49 are adjusted to permit bypassing of fluid from one chamber to the other. In this way lag is permitted between the drive shaft and driven shaft, either 10 or 11 through the bypasses in the plate and further lag between the rotors 12 and 13 and drum 29—30 the larger the openings, the greater the ratio.

If a shock absorber or a speed reducing transmission variable in ratio according to the load is desired, the device is used exactly as outlined for its use as a differential. By this means the starting torque on the driving mechanism is reduced, the speed of the driven shaft increasing as the load is decreased.

The operation of the device, when used as a shock absorbing, speed reducing, automatically actuated, transmission, is as follows;

Plate 14 is adjusted by means of screws 57, to provide the proper area of bypass through the apertures 45—55, rotation of the plate permitting any adjustment of the bypass from full open to closed, the larger the opening, the greater the fixed or normal ratio provided. Figs. 1 and 4 show the bypass nearly closed, while Fig. 5 shows the bypass full open. The springs are of proper tension to just resist the pressure of the fluid on the valves 48 when the driven member is being driven under normal load and speed, therefore will retain the valves 48 closed except under abnormal load conditions, such as starting.

With shaft 10 being driven counter-clockwise as viewed in Fig. 1, drum 29—30 is urged in the same direction through the interposed fluid. A portion of the fluid passes through the bypass 45—55 from the left hand compartment, Fig. 2 from ahead of the top vane 15, to the compartment on the other side of the plate 14, thus permitting the left hand rotor to creep on the drum. The fluid flowing into the right hand compartment flows in ahead of the top vane on the right hand side of the plate 14, while the fluid back of this vane flows through the other bypass into the left hand compartment, thus the fluid circulates between the upper chambers of the two compartments, and also between the lower chambers of the two compartments. The fluid flowing into the left hand compartment, permits the drum to lag relative to the left hand rotor, therefore, the drum lags relative to the left hand rotor and shaft 10, and the right hand rotor and shaft 11 lag relative to the drum, providing a double lag, whereby the drum rotates at a speed intermediate that of the shafts 10 and 11. This provides the ratio for normal load and speed.

The automatically actuated, shock absorbing reduction for abnormal load operates as follows;

When the pressure of the fluid is sufficient to overcome the reaction of the springs on the valves 48, fluid flows through the passages 53, depending on the restriction formed by the valves 48, or the lift thereof created by the pressure of the fluid ahead of the vanes, from the upper to the lower chamber on the right side of Fig. 1, left hand compartment Fig. 2, and from the lower to the upper chamber, right side Fig. 1, and left side Fig. 2, thus circulating between the upper and lower chamber in this compartment in a counter-clockwise direction. The same circulation occurs in the right hand compartment, Fig. 2, except in a reverse, or clockwise direction, thus the rotation of the drum is further decreased relative to the left hand rotor and shaft 10, and the rotation of the right hand rotor and shaft 11 is further decreased relative to the drum, and this increase in ratio increases with increase in load and decreases with decrease in load, and is inactive under normal load, as a definite pressure of fluid is required to lift the valves to permit passage of fluid between the chambers. The drum is a floating member when used as a speed reducer, and when adjusted, will automatically maintain normal load on the shaft 10 irrespective of the overload conditions on the shaft 11.

It will also be noted that the device is adapted for use as either a differential, speed reducer or fluid clutch without any change in the mechanism or parts. Referring to Fig. 6, which shows the device coupled up as a differential for automotive use, and being driven through the shaft 75. If the prime mover were changed from the shaft 75 to either of the other shafts, say 73, and no change whatever were made in the mechanism, the other shaft 74 would operate at a reduced speed, and the shaft 75 would be driven at a speed intermediate that of the shafts 73 and 74, neglecting the ratio of the gears shown, and considering them of unitary ratio.

A sudden overload applied to either, or both shafts 14 and 15, would instantly be met by an increase in ratio as the abnormal fluid pressure would force the valves 48 open and permit passage of fluid from chamber to chamber in each compartment, thus maintaining a normal load on the shaft 13 at all times, or at least, substantially normal.

This mechanism provides positive actuation of the plungers 15, provides means for equalizing the pressure back of the plungers, provides constant torque and maintains all spaces within the drum filled with fluid.

It provides substantially positive reduction ratios or ratios variable according to the load, therefore is ideally adapted as a speed reducing differential, speed reducing transmission for mechanical drives, automotive transmission, as a positive differential, or as a combination speed reducing transmission variable as to the load and differential.

Having described an operable method of constructing and using the invention it will be understood that variations in construction and arrangement of parts which are consistent with the appended claims may be resorted to without detracting from the spirit or scope of the invention or sacrificing any of the advantages thereof.

I claim:

1. An automatic speed reducing fluid clutch comprising a rotatable drum provided with a non-circular bore, forming restrictions, an adjustable dividing wall forming two interior axial compartments in said drum, a rotor in each compartment, said restrictions cooperating with the peripheries of said rotors, a plurality of plungers radially mounted in said rotors, spring means and fluid means for urging said plungers outwardly, means for equalizing fluid pressure for urging said plungers, pressure controlled bypass means in said restrictions, adjustable bypass means in said wall adapted to communicate between said compartments, and a shaft secured to each rotor and rotatably mounted in said drum.

2. An automatic speed reducing fluid clutch comprising, a rotatable drum, a bore formed in said drum, a wall centrally disposed in said bore forming thereby two compartments, a rotor in each of said compartments, a plurality of restrictions formed in each compartment and cooperating with the peripheries of said rotors, a passage for fluid formed through the wall of each of said restrictions, means actuated by the applied load for controlling the passage of fluid through said passages, a plurality of passages for fluid communicating between said compartments and means for adjusting the area of said passages, a plurality of radially disposed spring actuated plungers in each of said rotors, and a shaft secured to each rotor and axially mounted in hubs formed on said drum.

3. An automatic speed reducing fluid clutch comprising, a rotatable drum, a bore having diametric restrictions formed in said drum, a wall diametrically disposed in said bore forming two compartments, a rotor in each of said compartments peripherally cooperating with the walls of said restrictions and forming a plurality of chambers in each compartment between the periphery of said rotor and the walls of said bore, a passage formed through the walls of each restriction between said chambers, means for automatically controlling the passage relative to the applied load of fluid through said passages, a plurality of bypasses through said wall communicating with said passages, means for controlling the passage of fluid through said bypasses, a plurality of vanes in each of said rotors, fluid pressure equalizing means for said vanes, a shaft cooperating with each of said rotors and rotatably mounted in hubs formed on said drum, and automatically actuated means for maintaining said chambers filled with fluid.

4. An automatic speed reducing fluid clutch comprising, a housing, a fluid tight drum provided with a hub at each end and rotatably mounted in said housing, a shaft rotatable in each hub, a central bore and two oppositely disposed eccentric bores of substantially equal diameter to said central bore formed in said drum forming a substantially elliptical compartment, communicating passages between said eccentric bores, means for controlling the passage of fluid through said passages, a rotor fixed to each of said shafts and rotatable within and peripherally cooperating with said central bore, a plurality of radially urged vanes in said rotor adapted to cooperate with the periphery of said elliptical compartment, and fluid pressure equalizing means for said vanes.

5. An automatic speed reducing fluid clutch comprising, a housing, a fluid tight drum having hubs at each end thereof rotatably mounted in said housing, a shaft rotatable in each of said hubs a rotor fixed to each shaft, a diametrically disposed wall in said drum forming two compartments, each of said compartments having a plurality of restrictions providing fluid seals for said rotors and forming a plurality of chambers by cooperation with the peripheries of said rotors, fluid passages through said restrictions communicating between said chambers, automatic means for controlling the flow of fluid through said passages and controlled by the applied load, a plurality of radially disposed vanes slidably mounted in said rotors, said vanes being spring urged and fluid urged by cooperative actuation between said vanes, means for maintaining substantially constant fluid pressure for actuating said vanes and means for maintaining said chambers filled with fluid from a supply in said housing.

6. An automatic speed reducing fluid clutch comprising, a housing, a supply of fluid therein, a fluid tight drum provided with a hub at each end and rotatably mounted in said housing, a shaft rotatably mounted in each of said hubs, a rotor fixed to each shaft, a cylindrical wall intermediately disposed diametrically within said drum forming two similar compartments and rotatably mounted in an annular groove formed in said drum, a plurality of diametric restrictions formed in each compartment, means for adjustably securing said wall, a plurality of chambers formed in each compartment by cooperation of the peripheries of said rotors with the walls of said restrictions, fluid passages formed through the walls of said restrictions and communicating between adjacent chambers, means for controlling the flow of fluid between said chambers through said passages, fluid bypasses formed through said wall and communicating with said passages and between said compartments, a plurality of radially disposed blades slidably mounted in each of said rotors, said blades being spring urged and fluid urged by fluid communication between said blades, means for maintaining substantially constant fluid pressure for urging said blades, and means for automatically maintaining said chambers filled with fluid from said fluid supply.

7. In a fluid clutch having a rotor provided with a plurality of retractable vanes, means for obtaining uniform torque throughout each revolution of said rotor, comprising a drum having a compartment formed with a plurality of restrictions cooperating with the periphery of said rotor forming a plurality of chambers, three or more equi-angularly spaced vanes in said rotor for each chamber, a bypass formed through the walls of each restriction and communicating between adjacent chambers, a pressure actuated valve for each bypass, a recess formed in the wall of each chamber and communicating with the by-pass and extending each direction from each of said restrictions to an intermediate point terminating at points spanning two adjacent vanes, the space between said points fully cooperating with said vanes.

8. In combination with a fluid clutch having two compartments formed with restrictions and a rotor in each compartment, means for obtaining variable action between said rotors comprising a rotatably mounted dividing wall between said rotors, apertures formed through said wall, bypasses formed through the walls of said restrictions, transverse apertures in the walls of said restrictions communicating with said by-passes and adapted to register with the apertures in said wall, and means for angularly adjusting and securing said wall in adjusted position.

9. A fluid clutch comprising a drive shaft and a driven shaft and concentrically related, rotatable, fluid urging means cooperating between the shafts, adjustable fluid flow control means for adjusting the ratio between the shafts under normal load and speed, and automatically actuated fluid flow control means for automatically varying the ratio between the shafts under abnormal load, whereby overload on a driving element is obviated, said drive shaft maintaining normal speed and said driven shaft operating at a reduced speed under abnormal load, as related to the adjusted ratio of the clutch.

10. A fluid clutch comprising two coaxial shafts, a drum rotatably mounted and having a central partition dividing the drum into two compartments, a rotor in each compartment, the shafts being fixed to the rotors and rotatable relative to the drum, a plurality of radially urged vanes for each rotor, said compartments each being formed with restrictions cooperating with the periphery of the rotor, forming chambers, and adjustable fluid flow control means consisting of by-passes formed through the partition and adapted to register with apertures formed in the walls of the restrictions, two apertures communicating with each chamber, said partition being adjustable to coincidently adjust the passages formed by the by-passes and apertures to control the flow of fluid between the chambers on opposite sides of the partition, definite ratios thereby being established between the shafts under predetermined load and speed conditions.

11. A fluid clutch comprising two coaxial shafts, a drum rotatably mounted and having a central partition dividing the drum into two compartments, a rotor in each compartment, the shafts being fixed to the rotors and rotatable relative to the drum, a plurality of radially urged vanes for each rotor, said compartments each being formed with restrictions cooperating with the periphery of the rotor forming chambers, and automatically actuated fluid flow control means comprising, a by-pass formed through the wall of each restriction and communicating between the chambers, and a normally closed spring urged valve for each by-pass, said valves being opened proportionately to the abnormal fluid pressure existing on either side of the restriction, and retained closed under normal fluid pressure, whereby the ratio between the shafts is increased under abnormal load conditions.

12. A fluid clutch, in combination, a housing, a drum rotatable in said housing, a central, transverse partition in said drum forming two compartments, a rotor in each compartment, a shaft for each rotor, fluid means cooperating between the drum and the rotors, whereby, driving of one rotor through its shaft will drive the drum and the drum will drive the other rotor, adjustable means for by-passing fluid to provide a definite ratio between the two rotors under normal load, and means actuated by abnormal load on the shafts for increasing the ratio between the two rotors to obviate shock due to sudden overload conditions.

13. Fluid actuated means comprising a housing having two compartments, each of which is formed with a plurality of restrictions, a bypass formed through the wall of each of said restrictions, a pressure actuated valve for each of said bypasses, a rotor in each compartment and centrally mounted therein and peripherally cooperating with said restrictions, a plurality of vanes for each rotor, a recess formed in the wall of each compartment in each direction from each restriction and communicating with the bypass in the restriction and extending to an intermediate point, said recesses terminating at points spanning two adjacent vanes when in mid-position between the restrictions, the space between said points being fully cooperative with said vanes.

14. In combination, two coaxial shafts and a rotor for each shaft, concentrically related rotary fluid urging means cooperating with both rotors, means actuated by the applied load permitting the respective rotors to independently lead and lag relative to the fluid urging means, and means adjustable to permit predetermined unrestricted lead of one rotor coincidently creating corresponding lag of the other rotor.

15. In combination, two coaxial shafts and a rotor for each shaft, concentrically related, rotary, fluid urging means cooperating with both rotors, means actuated by the applied load permitting the respective rotors to independently lead and lag relative to the fluid urging means, and means adjustable to permit predetermined lead of one rotor coincidently creating corresponding lag of the other rotor, and means for maintaining uniform urgence at diametrically opposite points on each rotor.

PHIL A. FRIEDELL.